United States Patent
Jou et al.

(10) Patent No.: US 10,402,512 B2
(45) Date of Patent: Sep. 3, 2019

(54) SYSTEMS AND METHODS FOR MATHEMATICAL REGRESSION WITH INEXACT FEEDBACK

(71) Applicant: Interset Software, Inc., Ottawa (CA)

(72) Inventors: Stephan Jou, Richmond Hill (CA); Shaun Pilkington, Ottawa (CA)

(73) Assignee: Interset Software Inc., Ottawa (CA)

(*) Notice: Subject to any disclaimer, the term of this patent is extended or adjusted under 35 U.S.C. 154(b) by 350 days.

(21) Appl. No.: 15/144,621

(22) Filed: May 2, 2016

(65) Prior Publication Data

US 2016/0321382 A1   Nov. 3, 2016

Related U.S. Application Data

(60) Provisional application No. 62/155,820, filed on May 1, 2015.

(51) Int. Cl.
| | | |
|---|---|---|
| *G06F 17/50* | (2006.01) | |
| *G06F 17/18* | (2006.01) | |
| *G06N 20/00* | (2019.01) | |

(52) U.S. Cl.
CPC .......... *G06F 17/5009* (2013.01); *G06F 17/18* (2013.01); *G06F 17/5018* (2013.01); *G06F 2217/16* (2013.01); *G06N 20/00* (2019.01)

(58) Field of Classification Search
CPC ................................................. G06F 70/5018
USPC .......................................................... 703/2
See application file for complete search history.

(56) References Cited

U.S. PATENT DOCUMENTS

| | | | | |
|---|---|---|---|---|
| 5,513,098 A * | 4/1996 | Spall | .................... | G05B 13/027 700/38 |
| 6,490,573 B1 * | 12/2002 | Njemanze | ................ | G06N 3/04 706/19 |
| 2013/0018830 A1 * | 1/2013 | Dhurandhar | ........... | G06N 7/005 706/14 |
| 2013/0124626 A1 * | 5/2013 | Cathcart | ................ | G06Q 10/10 709/204 |
| 2015/0347414 A1 * | 12/2015 | Xiao | .................... | G06F 17/3053 707/749 |

OTHER PUBLICATIONS

Li, Iterative Learning Control for Batch Processes Based on Support Vector Regression Model with Batchwise Error Feedback. (Year: 2011).*

* cited by examiner

*Primary Examiner* — Lechi Truong
(74) *Attorney, Agent, or Firm* — DLA Piper LLP (US)

(57) ABSTRACT

The present invention provides methods for providing mathematical regression analysis. In particular, the method for conducting regression analysis comprises the steps of: selecting a regression model; selecting an initial set of regression parameters; applying the regression model to the initial set of regression parameters to create an initial set of regression values; selecting an improved set of regression values, wherein the improved set of regression values is selected from the set of initial regression values; generating a loss function based on the improved set; applying an iterative optimization method to the loss function and the improved set of regression values to generate a resultant set of regression values; and outputting the resultant set of regression values.

9 Claims, 2 Drawing Sheets

SYSTEMS AND METHODS FOR MATHEMATICAL REGRESSION WITH INEXACT FEEDBACK

CROSS-REFERENCE TO RELATED APPLICATIONS

This application claims benefit of priority under 35 U.S.C. § 119(e) of U.S. Ser. No. 62/155,820 filed May 1, 2015, the entire contents of which is incorporated herein by reference in its entirety.

BACKGROUND OF THE INVENTION

Field of the Invention

The present invention is directed to systems and methods for providing mathematical regression analysis. More specifically, the present invention provides methods and systems for providing mathematical regression analysis in situations where exact feedback on desired output values is difficult or impossible to obtain.

Background Information

Mathematical regression is a method for estimating the value of a set of dependent variables given a set of independent variables. Regression proceeds by having a user or system supply desired values for a large set of samples and an optimization method is utilized to train a regression model using a loss function. In traditional regression, the desired dependent output values provided are exact and do not change during the regression process.

It is frequently the case that it is difficult or impossible for a user or system to supply the exact desired dependent output variables. This can be because giving feedback is expensive in terms of time, effort, money or some other resource; a user or system cannot reliably give good values; or, the correct values are ambiguous (for example, the values are only relative and multiple different sets of values are equally valid).

In such cases, however, a supervising user or system, when given a set of possible values, may improve and potentially correct a subset of these values (i.e. the subset that is obviously wrong). In addition, it may also be possible for a supervising user or system to compare between two sets of possible regression values and determine which one is better.

Accordingly, there is a need for improved methods for providing mathematical regression analysis in situations where feedback is particularly difficult or impossible to obtain.

SUMMARY OF THE INVENTION

An object of the present invention is to provide systems and methods for mathematical regression with inexact feedback. In accordance with an aspect of the present invention there is provided a method for conducting regression analysis comprising the steps of: selecting a regression model; selecting an initial set of regression parameters; applying the regression model to the initial set of regression parameters to create an initial set of regression values; selecting an improved set of regression values, wherein the improved set of regression values is selected from the set of initial regression values; generating a loss function based on the improved set; applying an iterative optimization method to the loss function and the improved set of regression values to generate a resultant set of regression values; and outputting the resultant set of regression values.

Also provided is a computer program product comprising a computer readable memory storing computer executable instructions thereon that when executed by a computer perform the method of the invention.

Also provided is a system for regression analysis, said system comprising a processor and a computer readable storage media comprising executable instructions thereon that when executed by said processor perform the method of the invention.

DETAILED DESCRIPTION OF THE INVENTION

Figure 1:
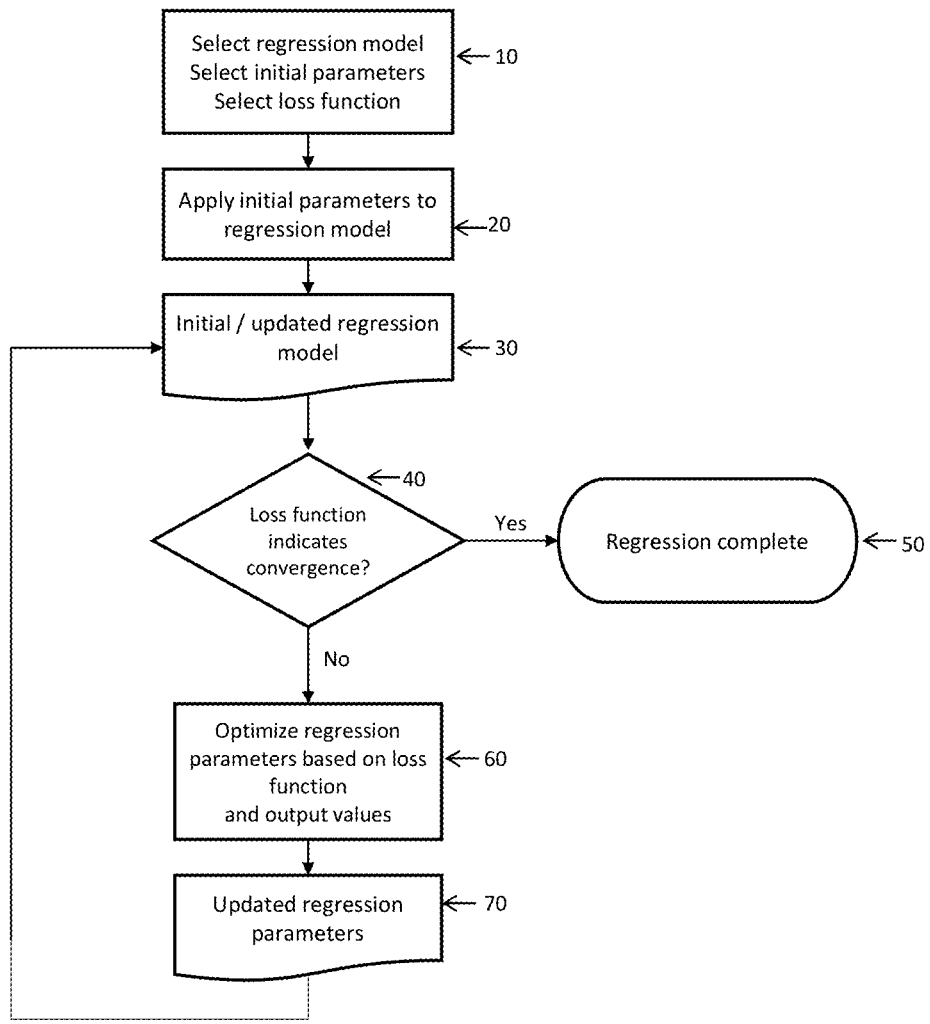
FIG. 1 is a workflow diagram of a method of traditional regression (prior art). A traditional regression analysis comprises the following steps: selecting regression model; initial parameters and loss function (10); applying initial parameters to the regression model (20) to produce the initial regression model (30); determining if loss function indicates convergence (40); if yes, the regression analysis is complete (50); if no, optimizing regression parameters based on loss function and output values (60) to produce updated regression parameters (70) which are then applied to the regression model (10). (30) and (40) are reiterated until regression is complete.
Figure 2:
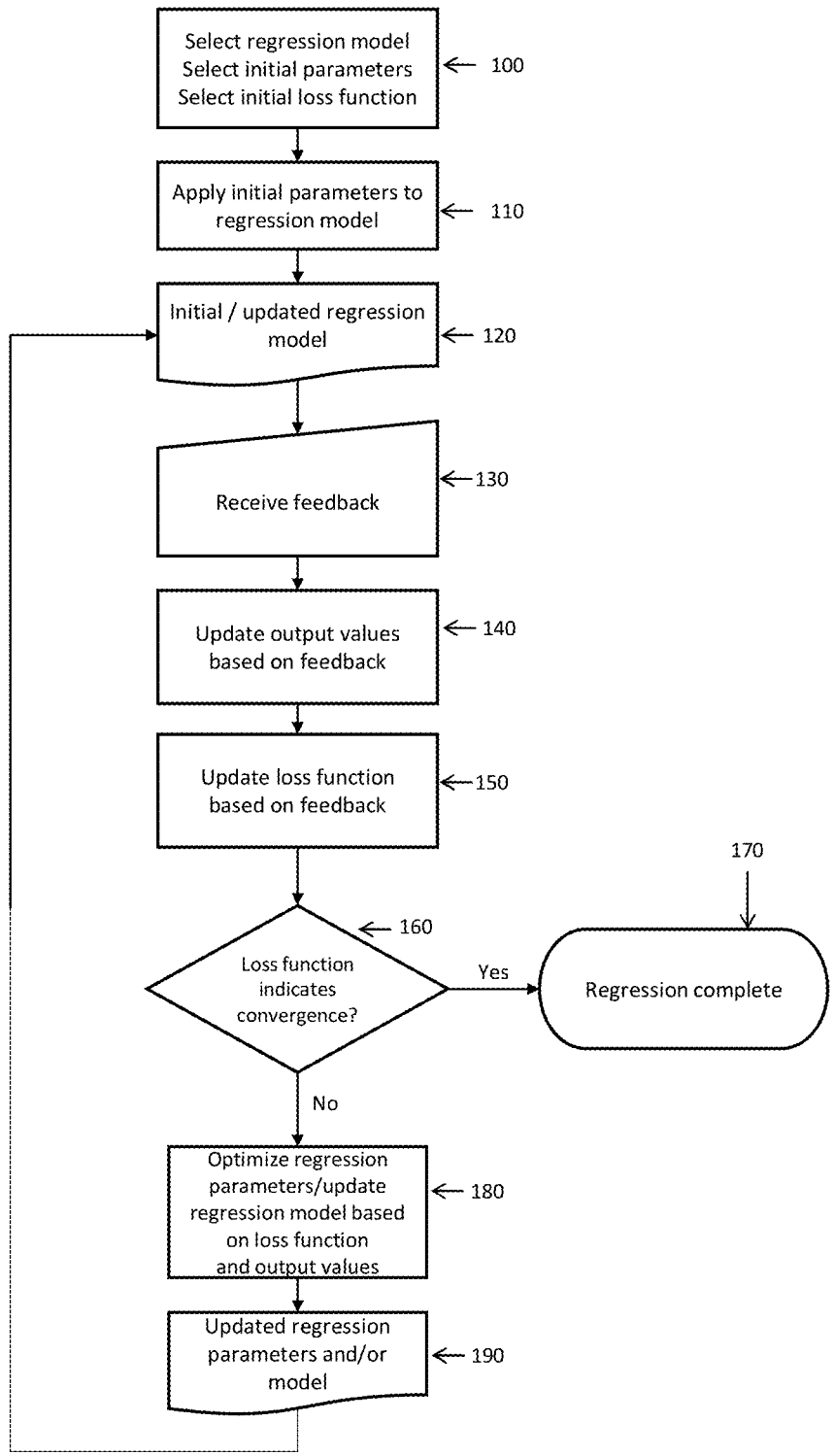
FIG. 2 is a workflow diagram of one embodiment of the method of regression of the invention. In this embodiment of the present invention, the method comprises the following steps: selecting regression model; initial parameters and initial loss of function (100); applying initial parameters to the regression model (110) to produce the initial regression model (120); receiving feedback (130); updating output values based on feedback (140); updating loss function based on feedback (150); determining if loss function indicates convergence (160); if yes, the regression analysis is complete (170); if no, optimizing regression parameters and/or regression model based on loss function and output values (180) to produce updated regression parameters and or regression model (190). (120) to (160) are reiterated until regression is complete.

As noted above, in regression analysis, it can be difficult or impossible to obtain exact feedback on desired output values however inexact feedback may be obtained. The present invention utilizes this inexact feedback to allow the mathematical regression to proceed. Accordingly, the present invention provides methods and systems for mathematical regression with inexact feedback. In at least one embodiment, the present invention provides a method for constructing a regression model as follows. First, an initial setting for the regression model parameters is selected, which supplies a starting guess for the regression values.

Second, the user or system chooses a subset of the values that can be easily improved (and in some embodiments, possibly corrected exactly), and the desired values are specified.

Third, the chosen subset is used to create the loss function, and an iterative optimization method such as, but not limited to, gradient descent is used to train the loss function on the subset.

Finally, after at least one iteration of applying the iterative optimization method, the process pauses. The current setting of the regression model parameters is used to determine regressed values for all of the samples (including both those for which desired values were supplied and those that were not). These values and possibly the current regression model parameters can then be displayed to the user or system.

At least one advantage of the presently disclosed method is that the user/system is able to choose between multiple courses of action to be taken that will provide information to improve the regression model fitting, without requiring exact desired dependent variables. It is contemplated that these courses of actions can include, but are not limited to, the following:

stop the process, keeping the current regression model parameters (i.e. process is done)

continue optimizing using the same loss function and optimization method reverse the direction of the optimization (e.g. to undo overfitting)

pause, keeping the same parameters, but choose new desired values for a new (potentially overlapping) subset pause, change the optimization method or parameters associated with the current optimization method It is contemplated that in at least one embodiment this set of options allow regression modeling to proceed in situations where giving feedback is hard. However, a number of other advantages are also contemplated, as follows.

First, by only assigning feedback to a subset of the data set, but having the ability to see the process unfold over the whole data set, allows the user/system to prevent overfitting. These unlabeled examples act similarly to the holdout method often used in optimization analysis for the current state of the art, as will be readily understood by the skilled person. In holdout methods, the regression model is fit on a subset, while being tested on the remaining holdout set. Training stops when the observed error starts increasing on the holdout set, thereby signifying that overfit has been achieved.

However, these known methods often require that the user/system must initially supply correct answers to all the examples in both the training and holdout set. As will be readily appreciated by the skilled person, this can often be quite difficult to do, and accordingly the method detailed here only requires that the user/system be able to identify whether an assignment of values for the holdout set is better or worse, which is an easier task to achieve.

Second, the ability to change the loss function similarly makes the task easier. Instead of being required to find correct values, the user/system needs only to supply improved values. After seeing the function perform some initial iterations of optimization the user/system is able to determine the new values supplied by the current parameterization.

It is contemplated that observing these new values for all of the datapoints may make it easier for the user/system to decide on improved values for some of the data points that have already been given feedback, or even a new datapoint that has subsequently become more evidently incorrect. This gives the user/system the opportunity to iteratively improve the desired values, while the optimization algorithm iteratively improves the resultant fit. This is particularly effective when the values are relative rather than based on an absolute scale.

Third, it is contemplated that the ability to change the optimization method or its parameters can provide an advantage as well. There are many different optimization methods with varying strengths and weaknesses, with sets of additional parameters to control those methods. Accordingly, it is contemplated that during the regression process it may be desirable to change these depending on the needs of the instant application of the present invention.

By way of non-limiting example, it is contemplated that the step size can be changed on gradient descent to a lower value as the fit improves or to give new starting parameters for the regression model while maintaining the same loss function. As will be readily appreciated by the skilled person, altering the parameters will give new regression values. The user/system could then immediately observe the effects of the change on all data points. This can, for instance, allow the user/system to do a guided search. More specifically, it is contemplated that the user/system can experiment with parameters, immediately seeing the results and supply some desired values and gradient descent can be used in order to determine an optimal direction to move the parameters in. This hybrid exploration can improve understanding and speed up the fitting process, and is typically difficult to do in a user-friendly fashion with currently known methods.

It is further contemplated that the regression model is changed by augmenting the regression method with new parameters. For example, in the case of under fitting, the same parameters can be maintained but additional parameters may be added for increased complexity without requiring that the process is started over. Alternatively, it is contemplated that an entirely different regression model can be selected while maintaining the current, potentially improved desired regression values.

EXAMPLE 1

Change the Loss Function Used to Fit

By way of non-limiting example, it is contemplated that different loss functions can have different attributes, such as, for example, the sum of squared error (SSE) penalizes outliers more than absolute error, as will be readily understood by the skilled person. In the process of fitting, a different loss function might become better, or one could use one loss function on some iterations (e.g. in general use SSE, but on some iterations only train on outliers and use absolute error). Moreover, it is contemplated that choosing a subset and supplying new or different values falls into this as the loss function is derived from these values.

EXAMPLE 2

Incorporating Analyst Feedback for Improved Risk Scoring in a Security Analytics System A security analytics system typically outputs a set of items, where the set may be a list of security or compliance alerts or behaviors. Examples of typical security alerts include: an IP address uploading an unusual amount of information to a low-reputation website, a machine generating unusual traffic patterns, or an employee copying a large number of files to a USB key, among many other possible items.

In a security analytics system that has scoring, these items are associated with a number, named the "risk score", which quantifies the amount of risk associated with these items. For example, the higher the risk score, the more priority, severity or criticality is ascribed to that item. This sorted or ranked set of items is typically processed by one or more human users, security operators, for further investigation. In the ideal case, the higher risk scores are produced for the items that are truly more important and relevant to the human users of the security analytics system.

In a traditional security analytics system, the human users rely on the risk scores to evaluate the severity of the security alerts. However, the user does not provide direct feedback on the scores to lead to improved, future scores. Instead, improving the scores is either done not at all, or done indirectly by, for example, adjusting the rules or weights that lead to the scores' calculation (e.g. when the USB key is used, increase the risk score by 10 instead of by 5). However, this type of adjustment requires knowledge of the score calculation methods or the global impact of such a change.

With the improved regression method described in this invention, a security analyst can instead provide feedback directly on the set of current scores, to produce a new regression model for the risk scores that better match the analyst's expectations. For example, the user can assert that a specified item that was scored with a 30 should really be an 80 (much more risky than the system assumed), or that a set of items should score lower than a different set, etc. Such feedback is more direct and more intuitive for a human security analyst. This feedback adjusts the output values (the risk scores), and using the method described, allow a regression to proceed to build an updated regression model that would improve the risk scores to match the desired output by the human analyst.

EXAMPLE 3

Building A Machine-Based Game Playing System When Game State Scoring is Difficult The traditional "Branch and Bound" approach to building an algorithm or a machine to play a game such as chess, depends on the ability to compute the strength of any possible player state. For example, to play chess, any given board state (fully defined by the position of the black and white chess pieces on the board) can be used to calculate a numerical score that represents the strength of that position. A branch and bound algorithm can then optimize for the set of possible moves from one given state to another.

There are certain games where it is not easy to calculate such a score for a given state. One well-understood example of such a difficult game by the skilled expert is the Japanese game of Go, where black and white stones are placed on a 13×13 grid and the two players take turns placing their stones on the board to capture pieces, with the winner being the player that has surrounded the greatest territory. One of the challenges of applying a traditional branch and bound approach to Go is that it is very difficult to examine a given state of the board (the placement of black and white stones on the grid) and compute its score; i.e. whether white is clearly ahead or black is clearly ahead. (Briefly, this is because the dominance of any given color in Go can change dramatically, even after the placement of a single stone, so it is non-trivial to examine a Go board and know by simply counting which side is ahead.)

However, for such games, human players can intuitively compare two game states and declare which state is stronger. In the example of Go, human players can examine a set of Go boards and intuitively declare which board position is stronger. Alternatively, a system can be developed to infer which state is stronger based on an analysis of historical games. In the example of Go, an analysis of historical games of Go can search for occurrences of the same or similar board states, and their proximity to a winning or losing outcome, to algorithmically infer which state is stronger.

The method of improved regression can be applied in such instances to iteratively build a model that can regress a score for a given game state, by interviewing human players or using a system that querying historical games and their outcomes, to determine how predicted game state score values should be modified. When the regression converges, the result will be a regression model that computes the score of a game state, based on the intuitive feedback provided by human experts or the inferred desirability based on historical game analysis.

Although the invention has been described with reference to the above examples, it will be understood that modifications and variations are encompassed within the spirit and scope of the invention. Accordingly, the invention is limited only by the following claims.

What is claimed is:

1. A method for conducting regression analysis comprising the steps of:
   selecting a regression model;
   selecting an initial set of regression parameters;
   applying the regression model to the initial set of regression parameters to create an initial set of regression values;
   receiving feedback;
   selecting an improved set of regression values based on said feedback, wherein said improved set of regression values is changed from said initial set of regression values;
   generating a loss function based on the improved set;
   applying an iterative optimization method to the loss function and the improved set of regression values, wherein aid improved set of regression value is potentially changed from the previous iteration, to generate a resultant set of regression values; and
   outputting the resultant set of regression values.

2. A computer program product comprising a computer readable memory storing computer executable instructions thereon that when executed by a computer perform the method of claim 1.

3. A system for regression analysis, said system comprising a processor and a computer readable storage media comprising executable instructions thereon that when executed by said processor perform the method of claim 1.

4. A method for conducting regression analysis comprising the steps of: a. selecting a regression model, regression parameters and a loss function; b. applying the regression model to the regression parameters to create output values; c. receiving feedback; d. updating output values and/or updating loss function based on said feedback, wherein said updating said output values comprises changing said output value, and wherein updating said loss function comprises replacing said loss function with a loss function having different attributes; e. determining if loss function indicates convergence, wherein if the loss function indicates convergence the regression analysis complete; and if the loss function indicates no convergence, said method further comprises: f. optimizing regression parameters and/or regression model based on loss function and output values to produce updated regression parameters and/or regression model, wherein steps b to e are reiterated until regression is complete;
wherein the optimizing is iterative.

5. The method of claim 4, wherein the optimizing is by gradient descent.

6. The method of claim 4, wherein optimizing utilizes the same method for each reiteration.

7. The method of claim 4, wherein optimizing utilizes a different method for each reiteration.

8. A computer program product comprising a computer readable memory storing computer executable instructions thereon that when executed by a computer perform the method of claim 4.

9. A system for regression analysis, said system comprising a processor and a computer readable storage media comprising executable instructions thereon that when executed by said processor perform the method of claim 4.

* * * * *